(12) United States Patent
Yoda et al.

(10) Patent No.: US 11,658,343 B2
(45) Date of Patent: May 23, 2023

(54) BATTERY MANUFACTURING METHOD

(71) Applicant: Nissan Motor Co., Ltd., Yokohama (JP)

(72) Inventors: Kazuyuki Yoda, Kanagawa (JP); Tomohiro Kaburagi, Kanagawa (JP); Eiji Minegishi, Kanagawa (JP); Koh Hatanaka, Kyoto (JP); Takuya Sakurai, Kyoto (JP); Masanori Shimada, Kyoto (JP); Yusuke Emori, Kyoto (JP); Yuichiro Yokoyama, Kyoto (JP)

(73) Assignee: Nissan Motor Co., Ltd., Yokohama (JP)

( * ) Notice: Subject to any disclaimer, the term of this patent is extended or adjusted under 35 U.S.C. 154(b) by 116 days.

(21) Appl. No.: 16/978,256

(22) PCT Filed: Mar. 20, 2019

(86) PCT No.: PCT/JP2019/011840
§ 371 (c)(1),
(2) Date: Sep. 4, 2020

(87) PCT Pub. No.: WO2019/198453
PCT Pub. Date: Oct. 17, 2019

(65) Prior Publication Data
US 2021/0005934 A1    Jan. 7, 2021

(30) Foreign Application Priority Data

Apr. 9, 2018  (JP) ............................. JP2018-074687

(51) Int. Cl.
*H01M 10/0585* (2010.01)
*H01M 10/613* (2014.01)
(Continued)

(52) U.S. Cl.
CPC ..... *H01M 10/0585* (2013.01); *H01M 4/0471* (2013.01); *H01M 4/668* (2013.01);
(Continued)

(58) Field of Classification Search
CPC ............. H01M 10/0585; H01M 10/04; H01M 10/613; H01M 10/0468; H01M 10/052;
(Continued)

(56) References Cited

U.S. PATENT DOCUMENTS

2012/0171567 A1* 7/2012 Obika ............... H01M 10/0463
156/182
2013/0295432 A1* 11/2013 Inoue ................. H01B 13/0036
174/268

(Continued)

FOREIGN PATENT DOCUMENTS

EP    2 557 625 A1   2/2013
JP    63-128547 A    6/1988
(Continued)

*Primary Examiner* — Matthew T Martin
*Assistant Examiner* — Adam J Francis
(74) *Attorney, Agent, or Firm* — Global IP Counselors, LLP

(57) ABSTRACT

A battery manufacturing method includes forming a unit cell having a positive electrode that is obtained by a positive electrode active material layer containing an electrolytic solution being disposed on a positive electrode current collector, a negative electrode that is obtained by a negative electrode active material layer containing an electrolytic solution being disposed on a negative electrode current collector, and a separator interposed between the positive and negative electrodes. Heat sealing a seal part that is disposed at an outer peripheral portion of the unit cell. Cooling the outer peripheral portion of the unit cell by using a cooling medium after carrying out the heat sealing of the seal part. The method is performed such that the positive (Continued)

electrode and the negative electrode are formed without an application film being subjected to a drying process performed through heating.

6 Claims, 7 Drawing Sheets

(51) Int. Cl.
  *H01M 50/46* (2021.01)
  *H01M 4/04* (2006.01)
  *H01M 4/66* (2006.01)
  *H01M 10/04* (2006.01)
(52) U.S. Cl.
  CPC ......... *H01M 10/04* (2013.01); *H01M 10/613* (2015.04); *H01M 50/46* (2021.01)
(58) Field of Classification Search
  CPC .... H01M 4/0471; H01M 4/668; H01M 50/46; H01M 4/04; H01M 10/058; H01M 10/12; H01M 10/28; H01M 10/23
  See application file for complete search history.

(56) References Cited

U.S. PATENT DOCUMENTS

| | | | | |
|---|---|---|---|---|
| 2015/0030890 | A1* | 1/2015 | Inoue | H01M 50/209 429/82 |
| 2015/0243989 | A1* | 8/2015 | Yamada | H01M 4/0416 427/113 |
| 2016/0300667 | A1* | 10/2016 | Okada | H01M 10/0525 |

FOREIGN PATENT DOCUMENTS

| | | |
|---|---|---|
| JP | 1-167946 A | 7/1989 |
| JP | 1-213955 A | 8/1989 |
| JP | 5-283087 A | 10/1993 |
| JP | 2011-210635 A | 10/2011 |
| JP | 2013-254727 A | 12/2013 |
| JP | 2015-521208 A | 7/2015 |
| JP | 2017-41310 A | 2/2017 |
| JP | 2017-147222 A | 8/2017 |
| JP | 2018-045902 A | 3/2018 |
| JP | 2018-133207 A | 8/2018 |
| JP | S633866 B2 | 1/2020 |

* cited by examiner

BATTERY MANUFACTURING METHOD

CROSS-REFERENCE TO RELATED APPLICATIONS

This application is a U.S. national stage application of International Application No. PCT/JP2019/011840, filed on Mar. 20, 2019, which claims priority to Japanese Patent Application No. 2018-074687, filed on Apr. 9, 2018. The entire disclosure of Japanese Patent Application No. 2018-074687 is incorporated in this specification by reference.

BACKGROUND

Technical Field

The present invention relates to a battery manufacturing method.

Background Technology

Development of secondary batteries that can be repeatedly charged and discharged as motor-driving power sources for electric vehicles (EV) and hybrid electric vehicles (HEV) is widespread. A secondary battery is manufactured by: forming a unit cell in which a positive electrode that comprises a positive electrode active material layer containing positive electrode active material, and a negative electrode that comprises a negative electrode active material layer containing negative electrode active material, are stacked with a separator interposed therebetween; and sealing, inside an outer cladding, a stack in which a plurality of the unit cells are stacked.

For example, Japanese Laid-Open Patent Application No. 2013-254727 (Patent Document 1) discloses a method for manufacturing a secondary battery, the method including: applying, to the surface of a current collector, an electrode active material slurry that includes an electrode active material, a binder, and a solvent, thus forming an application film; and using dried electrodes, in which the application film has been dried, to create unit cells.

SUMMARY

According to investigations performed by the inventors, it has been established that in a step for manufacturing a dry electrode that contains a binder as disclosed in Patent Document 1, there are cases where cracking occurs when the electrode active material slurry is dried. Cracking of the electrode can cause a pronounced reduction in battery performance. The inventors continued their investigations into a method for creating a unit cell using an electrode composed of a current collector and active material layers containing an electrolytic solution, as a manufacturing method that does not include a step for drying an electrode active material slurry, in order to prevent the occurrence of such cracking.

In cases where a unit cell is formed using electrodes containing an electrolytic solution, it is preferable to heat-seal the outer peripheral portion of the unit cell in order to prevent a liquid junction being formed due to leakage of the electrolytic solution from the unit cell. However, according to the investigations performed by the inventors, it has been established that creating a unit cell by performing such heat sealing yields insufficient cycle durability. This is because heat generated due to the heat sealing is transmitted via the current collector to the electrode active material layers, the electrolytic solution within the electrode active material layers is volatilized, and the composition of the electrode active material layers is changed.

The present invention was contrived in view of the matters described above, it being an object of the present invention to provide means with which it is possible to improve cycle durability in a battery manufacturing method in which electrodes containing an electrolytic solution are used.

The battery manufacturing method according to the present invention for achieving the above-mentioned object has a unit cell formation step, a sealing step, and a cooling step. In the unit cell formation step, a unit cell is formed by stacking a positive electrode that is obtained by a positive electrode active material layer containing an electrolytic solution being disposed on a positive electrode current collector, a negative electrode that is obtained by a negative electrode active material layer containing an electrolytic solution being disposed on a negative electrode current collector, and a separator interposed between the positive electrode and the negative electrode, and disposing a seal part disposed on an outer peripheral portion of the unit cell. In the sealing step, the seal part disposed at the outer peripheral portion of the unit cell is heat-sealed. In the cooling step, the outer peripheral portion of the unit cell is cooled by a cooling medium, the cooling step being performed after the sealing step.

BRIEF DESCRIPTION OF THE DRAWINGS

Referring now to the attached drawings which form a part of this original disclosure.

DETAILED DESCRIPTION OF EMBODIMENTS

Figure 1:
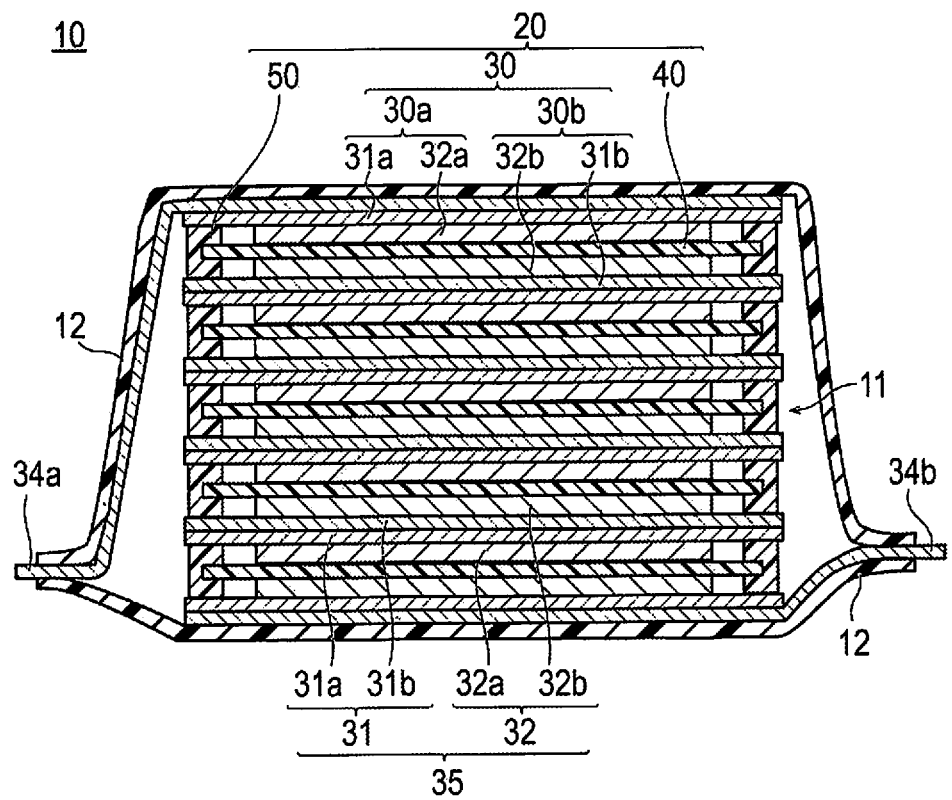
FIG. 1 is a cross-sectional diagram showing an overview of the overall structure of a battery according to one embodiment of the present invention.

A preferred embodiment of the present invention is described below with reference to the drawings. However, the technical scope of the present invention should be determined on the basis of the recitations in the claims, and is in no way limited solely to the embodiment described below. After the battery according to the present invention is described for the sake of convenience below, a method for manufacturing the battery according to the present invention is described in detail. Dimensions and proportions in the drawings are exaggerated for expediency of description, and can differ from actual proportions. In this specification, "X-Y" as used to indicate ranges refers to values "equal to or greater than X and equal to or less than Y."

Battery

A bipolar lithium ion secondary battery, which is one type of non-aqueous-electrolyte secondary battery, is described as one example of the battery according to the present invention. However, the battery to which the present invention is applied is not limited to bipolar lithium ion secondary batteries. A "bipolar lithium ion secondary battery" is a secondary battery that includes bipolar electrodes and is configured so that charging and discharging are performed due to transfer of lithium ions between a positive electrode and a negative electrode. For example, the present invention can also be applied to any conventionally well-known secondary battery, such as a so-called parallel stacked battery in which electrodes are connected in parallel in a power-generating element. In the description below, the bipolar lithium ion secondary battery is referred to simply as a "battery."

FIG. 1 is a cross-sectional diagram in which a battery 10 according to one embodiment of the present invention is schematically represented. The battery 10 is preferably structured so that the power-generating element in which the charge/discharge reaction actually progresses is sealed inside an outer cladding 12, as shown in FIG. 1, in order to prevent impact from the outside and/or environmental degradation.

As shown in FIG. 1, the power-generating element in the battery 10 of the present embodiment is a stack 11 formed by a plurality of unit cells 20 being stacked. The power-generating element is also referred to as a "stack 11" below. The number of unit cells 20 that are stacked is preferably adjusted in accordance with a desired voltage.

As shown in FIG. 1, a positive electrode 30a and a negative electrode 30b constitute a bipolar electrode 35 in which an electrically coupled positive electrode active material layer 32a is formed on one surface of a current collector 31 and an electrically coupled negative electrode active material layer 32b is formed on the opposite surface of the current collector 31.

In FIG. 1, the current collector 31 is depicted as a stacked structure (two-layer structure) in which a positive electrode current collector 31a and a negative electrode current collector 31b are combined, but the current collector 31 can instead be a single-layer structure composed of a single material.

Furthermore, in the battery 10 shown in FIG. 1, a positive electrode current collector plate (positive electrode tab) 34a is disposed so as to be adjacent to the positive electrode-side positive electrode current collector 31a, the positive electrode current collector plate 34a being extended and led out from the outer cladding 12. Moreover, a negative electrode current collector plate (negative electrode tab) 34b is disposed so as to be adjacent to the negative electrode-side negative electrode current collector 31b, the negative electrode current collector plate similarly being extended and led out from the outer cladding 12.

Unit Cell

Figure 2A:
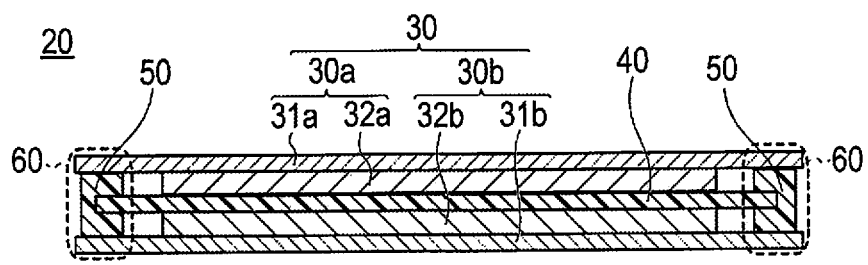
FIG. 2A is a cross-sectional diagram showing a unit cell of the secondary battery shown in FIG. 1.

FIG. 2A is a cross-sectional diagram showing a unit cell 20 of the battery 10 according to the present embodiment. As shown in FIG. 2A, the unit cell 20 is configured from the positive electrode 30a, the negative electrode 30b, and an electrolyte layer 40. The positive electrode 30a has a positive electrode active material layer 32a containing an electrolytic solution disposed on a positive electrode current collector 31a. The negative electrode 30b is formed by disposing a negative electrode active material layer 32b containing an electrolytic solution on a negative electrode current collector 31b.

The positive electrode active material layer 32a and the negative electrode active material layer 32b are disposed so as to face each other with the electrolyte layer 40 interposed therebetween. The positive electrode current collector 31a and the negative electrode current collector 31b are positioned at the outermost layers of the unit cell 20.

Seal parts 50 are disposed at outer peripheral portions 60 of the unit cell 20. In this specification, the outer peripheral portion 60 of the unit cell 20 is defined as a region that is heat-sealed via the seal parts 50 (regions surrounded by dashed lines in FIG. 2A). In cases of a configuration in which the seal parts 50 are interposed between the outer peripheral portions of the positive electrode current collector 31a and the outer peripheral portions of the negative electrode current collector 31b, as in the present embodiment shown in FIG. 2A, regions that include the outer peripheral portions of the current collector 31 and the seal parts 50 correspond to the outer peripheral portion 60 of the unit cell 20.

Figure 2B:
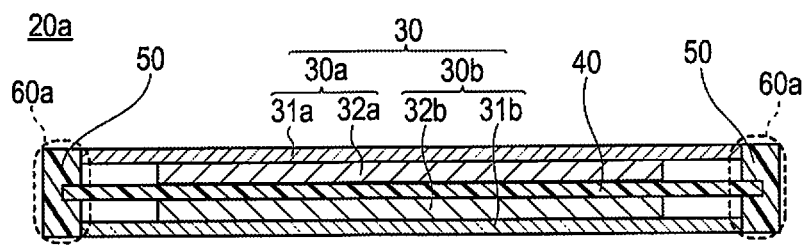
FIG. 2B is a cross-sectional diagram showing a unit cell of a secondary battery according to another embodiment of the present invention.

FIG. 2B is a cross-sectional diagram showing a unit cell 20a of a battery according to another embodiment of the present invention. In cases of a configuration in which the seal part 50 is disposed further outward in a planar direction than the outer periphery of the current collector 31, as in the unit cell 20a according to the other embodiment shown in FIG. 2B, regions in which end parts of the current collector 31 and the seal parts 50 are disposed correspond to the outer peripheral portion 60a of the unit cell 20a.

The seal parts 50 liquid-tightly seal the peripheries of the positive electrode active material layer 32a, the negative electrode active material layer 32b, and the electrolyte layer 40, preventing formation of a liquid junction due to leakage of the electrolytic solution. The positive electrode current collector 31a and the negative electrode current collector 31b are electrically separated from each other within the unit cell 20, preventing short-circuiting due to the positive electrode current collector 31a and the negative electrode current collector 31b coming into contact with each other.

Current Collector

The current collector 31 (adjacent ones of the positive electrode current collector 31a and the negative electrode current collector 31b) has a function for mediating transfer of electrons from one surface in contact with the positive electrode active material layer 32a to another surface in contact with the negative electrode active material layer 32b. The material constituting the current collector 31 is not particularly limited. For example, an electroconductive resin or metal can be used.

From the standpoint of reducing the weight of the current collector 31, the current collector 31 is preferably a resin current collector formed from an electroconductive resin. From the standpoint of blocking transfer of lithium ions between the unit cells 20, a metal layer can be provided to part of the resin current collector.

Specifically, examples of the electroconductive resin serving as the material that constitutes the resin current collector include resins in which an electroconductive filler is added, as needed, to an electroconductive polymer material or a non-electroconductive polymer material. Examples of the electroconductive polymer materials include polyaniline, polypyrrole, polythiophene, polyacetylene, polyparaphenylene, polyphenylenevinylene, and polyoxadiazole. Such electroconductive polymer materials are useful in terms of simplifying manufacturing steps and reducing the weight of the current collector due to having adequate electroconductivity even when no electroconductive filler is added.

Examples of the non-electroconductive polymer materials include polyethylene (PE, such as high-density polyethylene (HDPE) and low-density polyethylene (LDPE)), polypropylene, (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-electroconductive polymer materials can have exceptional potential resistance and solvent resistance.

Any electroconductive substance can be used as the electroconductive filler without particular limitation. Examples of material having exceptional electroconductivity, potential resistance, and lithium-ion-blocking properties include metals and electroconductive carbons. The metals are not particularly limited. However, it is preferable to include at least one metal selected from the group consisting of nickel, titanium, aluminum, copper, platinum, iron, chromium, tin, zinc, indium, antimony, and potassium, or to include an alloy or metal oxide that includes these metals. The electroconductive carbons also are not particularly limited. It is preferable to include at least one selected from the group consisting of acetylene black, Vulcan®, Black Pearl®, carbon nanofiber, Ketjen Black®, carbon nanotubes (CNTs), carbon nanohorns, carbon nanoballoons, and fullerenes.

The amount of electroconductive filler added is not particularly limited, provided that the amount makes it possible to impart adequate electroconductivity to the current collector 31. The amount added is preferably about 5-35 vol %.

In cases where the current collector 31 is formed from a metal, examples of the metal include aluminum, nickel, iron, stainless steel, titanium, and copper. Aside from these metals, a cladding material of nickel and aluminum, a cladding material of copper and aluminum, or a plating material of these metals can be preferably used. A foil can also be formed on the metal surface by coating with aluminum. Among these options, aluminum, stainless steel, copper, and nickel are preferred from the standpoint of, inter alia, electron transmittivity, battery action potential, and adhesion of the negative electrode active material through sputtering onto the current collector.

Electrode Active Material Layer (Positive Electrode Active Material Layer, Negative Electrode Active Material Layer)

Electrode active material layers (the positive electrode active material layer 32a, the negative electrode active material layer 32b) 32 include an electrode active material (the positive electrode active material or the negative electrode active material) and an electrolytic solution. The electrode active material layers 32 can also include a coating agent (the coating resin, the electroconductive auxiliary agent), an electroconductive member, etc., as needed. Furthermore, the electrode active material can also include an ion-transmitting polymer, etc., as needed.

The electrolytic solution included in the electrode active material layers 32 functions as a dispersion medium for the electrode active material in a step for preparing a slurry (described below). From the standpoint of omitting a step for injecting the electrolytic solution in steps after formation of the electrode 30 to reduce the number of steps, the electrolytic solution in the electrode active material layers 32 preferably has the same composition as the electrolytic solution included in the electrolyte layer 40 of the battery 10.

The electrolytic solution has a form in which a lithium salt is dissolved in a solvent. Examples of the solvent constituting the electrolytic solution include ethylene carbonate (EC), propylene carbonate (PC), dimethyl carbonate (DMC), diethyl carbonate (DEC), ethyl methyl carbonate, and other carbonates. Examples of the lithium salt include: $LiPF_6$, $LiBF_4$, $LiSbF_6$, $LiAsF_6 LiClO_4$, $Li[(FSO_2)_2N]$ (LiFSI), and other lithium salts of inorganic acids; and $LiN(CF_3SO_2)_2$, $LiN(C_2F_5SO_2)_2$, $LiC(CF_3SO_2)_3$, and other lithium salts of organic acids.

Positive Electrode Active Material

Examples of the positive electrode active material include: $LiMn_2O_4$, $LiCoO_2$, $LiNiO_2$, $Li(Ni-Mn-Co)O_2$, oxides in which some of the transition metals are substituted by other elements, and other lithium-transition metal composite oxides; lithium-transition metal phosphate compounds; and lithium-transition metal sulfate compounds. Depending on the situation, two or more positive electrode active materials can be used in combination. From the standpoint of capacity and output characteristics, it is preferable to use a lithium-transition metal composite oxide as the positive electrode active material. It is more preferable to use a composite oxide that contains lithium and nickel as the positive electrode active material. It is even more preferable to use $Li(Ni-Mn-Co)O_2$, oxides in which some of the transition metals are substituted by other elements (also referred to simply as "NMC composite oxides" below), lithium-nickel-cobalt-aluminum composite oxides (also referred to simply as "NCA composite oxides" below), etc. The NMC composite oxides have a layered crystal structure in which lithium atom layers and transition metal (with Mn, Ni, and Co arranged in an orderly manner) atom layers are alternatingly overlapped with oxygen atom layers interposed therebetween. One lithium atom is included per atom of transition metals, and the amount of lithium drawn out is twice that of spinel-based lithium manganese oxide; specifically, the supply capability is doubled, and it is possible to have high capacity.

Negative Electrode Active Material

Examples of the negative electrode active material include: graphite, soft carbon, hard carbon, and other carbon materials; lithium-transition metal composite oxides (e.g., $Li_4Ti_5O_{12}$); metal materials (tin, silicon); and lithium-alloy-based negative electrode materials (e.g., lithium-tin alloys, lithium-silicon alloys, lithium-aluminum alloys, lithium-aluminum-manganese alloys, etc.). Depending on the situation, two or more negative electrode active materials can be used in combination. From the standpoint of capacity and output characteristics, it is preferable to use a carbon material, a lithium-transition metal composite oxide, or a lithium-alloy-based negative electrode material as the negative electrode active material. As shall be apparent, negative electrode active materials other than those described above can also be used. (Meth)acrylate copolymers and other coating resins have properties that facilitate adhesion to carbon materials in particular. Therefore, from the standpoint of providing an electrode material that is structurally stabilized, it is preferable to use a carbon material as the negative electrode active material.

Electroconductive Auxiliary Agent

The electroconductive auxiliary agent is used as a coating agent that coats the surface of the electrode active material together with the coating resin. The electroconductive auxiliary agent can contribute to improvement in output characteristics at a high rate in the battery by forming an electron transmission path within the coating agent and reducing the electron transfer resistance of the electrode active material layers 32.

Examples of the electroconductive auxiliary agent include: aluminum, stainless steel, silver, gold, copper, titanium, and other metals, as well as alloys and metal oxides of these metals; and graphite, carbon fiber (specifically vapor-grown carbon fiber (VGCF), etc.), carbon nanotubes (CNTs), carbon black (specifically acetylene black, Ketjen Black®, furnace black, channel black, thermal lamp black, etc.), and other types of carbon. However, the electroconductive auxiliary agent is not limited to these examples. Substances in which a granular ceramic material or resin material is plated or otherwise coated with the metal materials described above can also be used as the electroconductive auxiliary agent. Among these electroconductive auxiliary agents, from the standpoint of electrical stability, it is preferable to include at least one selected from the group consisting of aluminum, stainless steel, silver, gold, copper, titanium, and carbon, more preferable to include at least one selected from the group consisting of aluminum, stainless steel, silver, gold, and carbon, and even more preferable to include at least one carbon. One of these electroconductive auxiliary agents can be used alone, or two or more can be used in combination.

The electroconductive auxiliary agent preferably has a particulate or fibrous form. In cases where the electroconductive auxiliary agent is a particulate, the form of the particles is not particularly limited; any form, such as pulverulent, spheroidal, rod-like, acicular, laminar, columnar, irregular, flaked, or fusiform, can be employed. The average particle diameter (primary particle diameter) in cases where the electroconductive auxiliary agent is a particulate is preferably no more than 100 nm. In this specification, "particle diameter" refers to the greatest distance from among distances between any two points on the contour of the electroconductive auxiliary agent. A value calculated as the average value of the particle diameters of particles observed in several or several tens of fields of view using a scanning electron microscope (SEM), a transmission electron microscope (TEM), or another observation means is employed as the value of the "average particle diameter."

Electroconductive Member

The electroconductive member has a function for forming an electron transmission path within the electrode active material layers 32. In particular, at least part of the electroconductive member preferably forms an electroconductive passage via which two primary surfaces of the electrode active material layers 32 are electrically connected to each other. Having such a form further reduces the electron transfer resistance in a thickness direction of the electrode active material layers 32, and therefore the output characteristics can be even further improved at a high rate in the battery. It is possible to confirm, by observing a cross-section of the electrode active material layers 32 using a SEM or an optical microscope, whether at least part of the electroconductive member forms an electroconductive passage via which the two primary surfaces of the electrode active material layers 32 are electrically connected to each other.

The electroconductive member is preferably electroconductive fiber having a fibrous form. Specific examples include: PAN-based carbon fiber, pitch-based carbon fiber, and other carbon fiber; electroconductive fiber obtained by uniformly dispersing a highly electroconductive metal or graphite in synthetic fiber; metal fiber in which a metal such as stainless steel is formed into fiber; electroconductive fiber in which the surface of organic fiber is coated with a metal; and electroconductive fiber in which the surface of organic fiber is coated with a resin that contains an electroconductive substance. Among these fibers, carbon fiber is preferred due to having exceptional electroconductivity and low weight.

In the battery 10 of the present embodiment, a thickness of the electrode active material layers 32, as pertains to the positive electrode active material layer 32a, is preferably 150-1500 μm, more preferably 180-950 μm, and even more preferably 200-800 μm. A thickness of the negative electrode active material layer 32b is preferably 150-1500 μm, more preferably 180-1200 μm, and even more preferably 200-1000 μm. If the thickness of the electrode active material layers 32 is a value equal to or greater than the lower-limit value described above, the energy density of the battery can be adequately raised. If the thickness of the electrode active material layers 32 is a value equal to or less than the upper-limit value described above, the structure of the electrode active material layers 32 can be adequately maintained.

In the battery 10 of the present embodiment, other than the electrode active material, as well as the electroconductive member, the ion-transmitting polymer, the lithium salt, and the coating agent (coating resin, electroconductive auxiliary agent), which are used as needed, other members can be used, as appropriate, as constituent members of the electrode active material layers 32. However, from the standpoint of improving the energy density of the battery, it is preferable not to incorporate members that do not contribute much to the progression of the charge/discharge reaction. For example, use of a binder that is added in order to bind the electrode active material and other members and maintain the structure of the electrode active material layers 32 is preferably avoided as much as possible. Examples of binders having the functions described above include polyvinylidene fluoride (PVdF) and other solvent-based binders, and styrene-butadiene rubber (SBR) and other water-based binders. Specifically, the binder content is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

Electrolyte Layer

The electrolyte layer 40 is a layer in which an electrolyte is held by a separator, the electrolyte layer 40 being disposed between the positive electrode active material layer 32a and the negative electrode active material layer 32b, and preventing direct contact between these two layers. The electrolyte used in the electrolyte layer 40 of the present embodiment is not particularly limited. Examples include electrolytic solutions and gel polymer electrolytes. Using these electrolytes can ensure lithium ion transmission properties.

The same electrolytic solution as is used in the electrode active material layers 32 can be used in the electrolyte layer 40. The concentration of the lithium salt in the electrolytic solution is preferably 0.1-3.0 M, and more preferably 0.8-2.2 M. The amount used in cases where additives are used is preferably 0.5-10 mass %, and more preferably 0.5-5 mass %, relative to 100 mass % of the electrolytic solution before the additives are added.

Examples of additives include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyl oxymethyl ethylene carbonate, acryl oxymethyl ethylene carbonate, methacryloxymethyl ethylene carbonate, ethynyl ethylene carbonate, propargyl ethylene carbonate, ethynyl oxymethyl ethylene carbonate, propargyl oxyethylene carbonate, methylene ethylene carbonate, and 1,1-dimethyl-2-methylene ethylene carbonate. Among these additives, vinylene carbonate, methyl vinylene carbonate, and vinyl ethylene carbonate are preferred, and vinylene carbonate and vinyl ethylene carbonate are more preferred. One of these cyclic carbonate esters can be used alone, or two or more can be used in combination.

The gel polymer electrolyte has a configuration obtained by injecting the electrolytic solution described above into a matrix polymer (host polymer) composed of an ion-transmitting polymer. Using a gel polymer electrolyte as the electrolyte eliminates fluidity of the electrolyte and is exceptional in terms of simplicity due to blocking the transmission of ions between layers. Examples of the ion-transmitting polymer used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HFP), polymethyl methacrylate (PMMA), and copolymers of these.

The matrix polymer of the gel polymer electrolyte forms a cross-linked structure, thereby making it possible to realize exceptional mechanical strength. A suitable polymerization initiator is used in forming the cross-linked structure. Heat-induced polymerization, UV-ray-induced polymerization, radiation-induced polymerization, electron-beam-induced polymerization, or another polymerization process should be implemented on a polymerizable polymer (e.g., PEO or PPO) for forming a polymer electrolyte.

The separator has a function for holding the electrolyte to ensure lithium ion transmission properties between the electrode 30a and the electrode 30b, and a function for forming a partition between the electrode 30a and the electrode 30b.

Examples of the form of the separator include porous-sheet separators composed of a polymer or fiber that holds the electrolyte through absorption, and non-woven-fabric separators.

Positive Electrode Current Collector Plate And Negative Electrode Current Collector Plate The material constituting the current collector plates 34a, 34b is not particularly limited. Well-known electroconductive materials that are conventionally used as current collector plates in lithium ion secondary batteries can be used. The material constituting the current collector plates 34a, 34b is preferably, e.g., aluminum, copper, titanium, nickel, stainless steel, alloys of these, or other metal materials. From the standpoint of low weight, high corrosion resistance, and high electroconductivity, aluminum and copper are more preferred, and aluminum is particularly preferred. In each of the positive electrode current collector plate 34a and the negative electrode current collector plate 34b, the same material or different materials can be used.

Seal Parts

The seal parts 50 have a function for preventing contact between the current collectors 31 and preventing short-circuiting in end parts of the unit cells 20. The material constituting the seal parts 50 should have insulation properties, sealing properties (liquid-tightness), heat resistance at temperatures at which the battery operates, etc. For example, acrylic resins, urethane resins, epoxy resins, polyethylene resins, polypropylene resins, polyimide resins, and rubbers (ethylene-propylene-diene rubber: EPDM) can be used. In addition, isocyanate-based adhesives, acrylic-resin-based adhesives, cyanoacrylate-based adhesives, etc., can be used, and hot-melt adhesives (urethane resins, polyamide resins, polyolefin resins), etc., can also be used. Among these materials, polyethylene resins and polypropylene resins are preferably used as the material constituting an insulating layer from the standpoint of corrosion resistance, chemical resistance, ease of handling (film formability), economy, etc. A resin in which ethylene, propylene, and butene are copolymerized and which has an amorphous polypropylene resin as a main component is preferably used.

Outer Cladding

In the present embodiment shown in FIG. 1, the outer cladding 12 is configured in the form of a bag from a laminate film, but the present invention is not limited to this configuration. For example, a well-known metal can case, etc., can be used. The outer cladding 12 is preferably configured from a laminate film from the standpoint of exceptional increases in output and cooling performance, as well as from the standpoint of making it possible to appropriately use the battery 10 as a battery for a large-scale apparatus such as an EV or a HEV. Examples of laminate films that can be used include those obtained by laminating polypropylene (PP), aluminum, and nylon in the stated order to yield a three-layer structure, but the present invention is in no way limited to these materials. In addition, the group pressure applied to the stack 11 from the outside can easily be adjusted, and the electrolyte layer 40 is easily adjusted to a desired thickness; therefore, the outer cladding 12 is preferably an aluminate laminate.

Method for Manufacturing Battery

One aspect of the present invention pertains to a battery manufacturing method. A battery manufactured using the battery manufacturing method according to the present embodiment can be used as a non-aqueous-electrolyte secondary battery such as the bipolar battery according to the embodiment described above.

Figure 3:
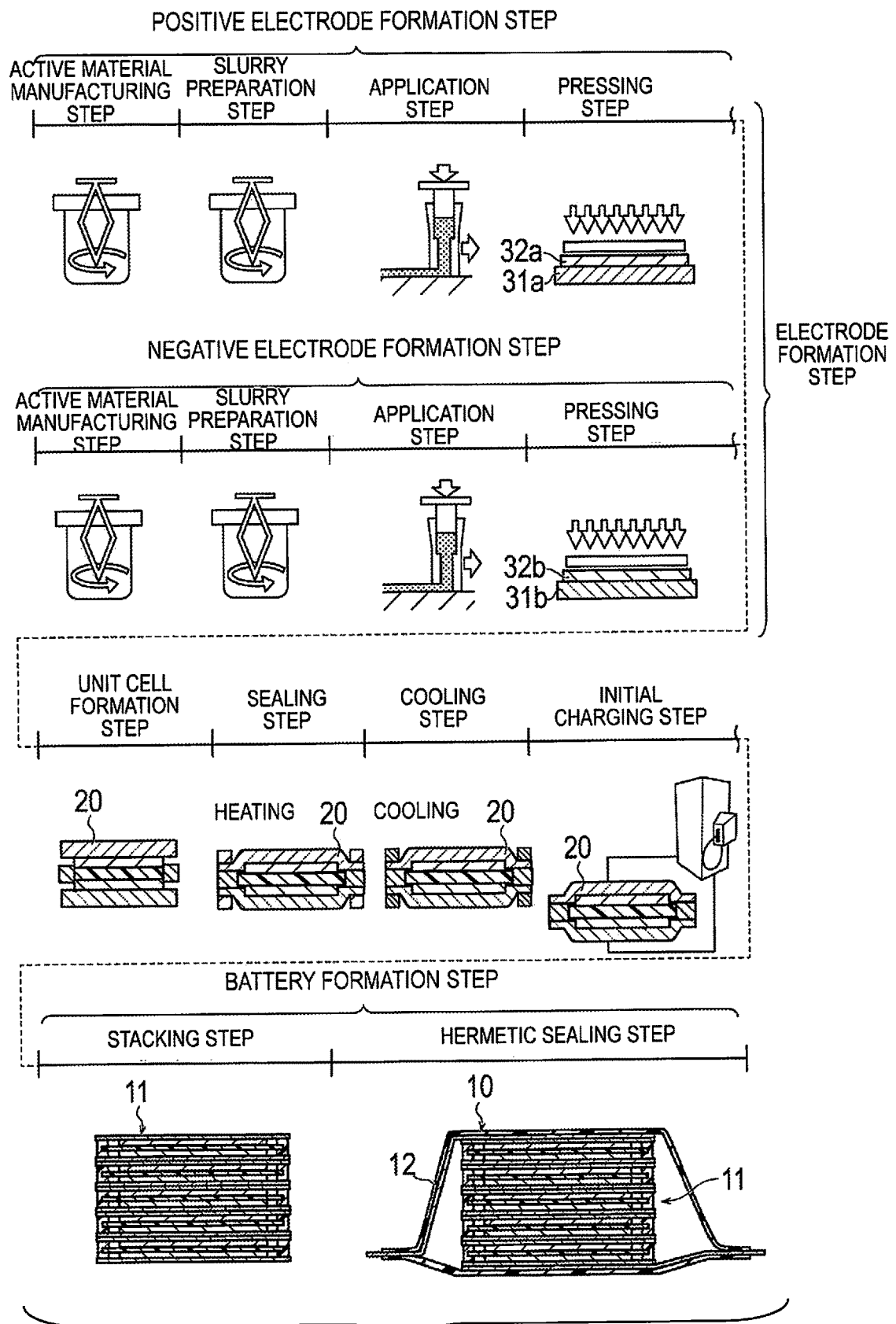
FIG. 3 is an overview diagram showing one example of a series of steps in a battery manufacturing method according to one embodiment of the present invention.
Figure 4:
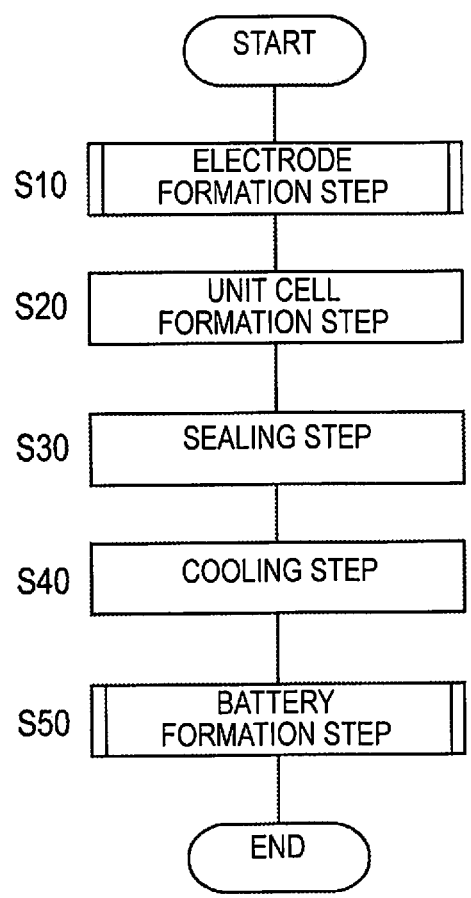
FIG. 4 is a flow chart for illustrating the battery manufacturing method according to one embodiment of the present invention.

FIG. 3 is an overview diagram showing one example of a series of steps in a method for manufacturing a battery 10 according to the present embodiment. FIG. 4 is a flow chart for illustrating the method for manufacturing a battery 10 according to the present embodiment. The method for manufacturing a battery 10 according to the present embodiment has an electrode formation step (S10), a unit cell formation step (S20), a sealing step (S30), a cooling step (S40), and a battery formation step (S50), as shown in FIGS. 3 and 4.

In the method for manufacturing a battery 10 shown in FIG. 3, an initial charging step is performed between the cooling step (S40) and the battery formation step (S50), but the present invention is not limited to this configuration. The initial charging step can be performed after the battery formation step (S50). In addition, in the electrode formation step (S10) shown in FIG. 3, an example is shown in which an application film obtained through an application step is cut into segments that are then pressed one at a time, but the present invention is not limited to this configuration. The application step and a pressing step can be performed continuously using a roll-to-roll process.

The method for manufacturing a battery 10 according to the present embodiment necessarily includes, after the sealing step (S30) for heat-sealing the seal parts 50 disposed at the outer peripheral portions 60 of the unit cell 20 (see FIG. 2A), the cooling step (S40) for cooling the outer peripheral portions 60 of the unit cell 20. In the method for manufacturing a battery 10 according to the present embodiment, cooling the heated outer peripheral portions 60 of the unit cell 20 makes it possible to minimize the transmission of heat to the electrode active material layers 32 via the current collector 31 and the incidence of volatilization of the electrolytic solution within the electrode active material layers 32. As a result, it is possible to suppress changes in the composition of the electrode active material layers 32 and improve the cycle durability. The seal parts 50 are formed in the unit cell formation step (S20).

The method for manufacturing a battery 10 according to the present invention is described in detail below so as to include the characteristics described above.

Electrode Formation Step

Figure 5:
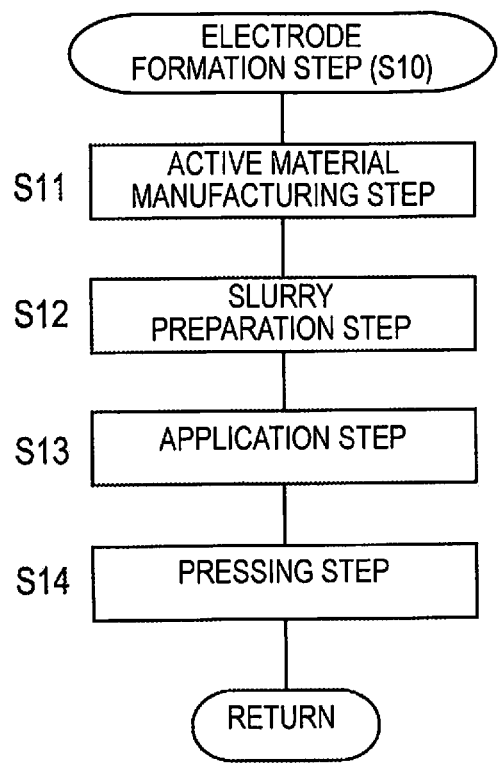
FIG. 5 is a subroutine flow chart for the electrode formation step (S10) shown in FIG. 4.

The electrode formation step (S10) is described first with reference to FIG. 5. FIG. 5 is a subroutine flow chart for the electrode formation step (S10) shown in FIG. 4. As shown in FIG. 5, the electrode formation step (S10) according to the present embodiment preferably includes an active material manufacturing step (S11), a slurry preparation step (S12), an application step (S13), and a pressing step (S14).

Active Material Manufacturing Step

The electrode active material is manufactured in the active material manufacturing step. The method for manufacturing a coated electrode active material is not particularly limited. Examples include the following method. First the electrode active material is introduced into an all-purpose mixer and is stirred at a speed of 10-500 rpm, and a solution (coating resin solution) that contains a coating resin and a solvent is added dropwise to the mixture over a period of 1-90 minutes. Methanol, ethanol, isopropanol, or other alcohols can be suitably used as the solvent in this instance. The electroconductive auxiliary agent is then furthermore added and mixed in. The temperature is then raised to 50-200° C. while the stirring is performed, and the pressure is reduced to 0.007-0.04 MPa, after which these conditions are maintained for 10-150 minutes, thereby making it possible to obtain a coated electrode active material.

Slurry Preparation Step

The electrode active material and the electrolytic solution, which is a dispersion medium, are mixed to prepare an electrode active material slurry. The electrode active material slurry is a mixture that necessarily includes the electrode active material and the electrolytic solution. With respect to the solid content ((coated) electrode active material, electroconductive member, ion-transmitting polymer, lithium salt, etc.) included in the electrode active material slurry, the same configuration as was described above (type, amount, etc.) can be employed, and therefore detailed description of this configuration is omitted here. Small amounts of a binder can also be added, as needed, to an application liquid. However, the binder content in the application liquid is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

The electrolytic solution (dispersion medium) constituting the electrode active material slurry is eventually used as an electrolytic solution constituting the electrode active material layers 32. Because the electrolytic solution (dispersion medium) constituting the electrode active material slurry is the same as the electrolytic solution constituting the electrode active material layers 32, detailed description of the liquid electrode is omitted here.

The method for mixing the components included in the electrode active material slurry and preparing the electrode active material slurry is not particularly limited. Conventionally well-known expertise can be referred to, as appropriate, with respect to the sequence for adding the members and the method for carrying out mixing. However, because the solid content concentration of the electrode active material slurry is comparatively high, it is preferable to use a mixer that can impart high shear as the mixer for mixing the materials. Specifically, a planetary mixer, a kneader, a homogenizer, an ultrasonic homogenizer, a disperser, or another bladed stirrer is preferred, a planetary mixer being particularly preferred form the standpoint of churning in particular. The specific method for mixing is also not particularly limited, but it is preferable to implement churning at a higher solid content concentration than the final solid content concentration, subsequently add a dispersion medium component, and then carry out further mixing to thereby prepare the electrode active material slurry. The mixing time is not particularly limited. A uniform mixture should be achieved. As an example, churning and subsequent mixing are each to be performed in about 10-60 minutes, and each step can be carried out once or a plurality of times.

Application Step

In the application step, the electrode active material slurry obtained as described above is applied to the surfaces of the current collector 31 to form application films. The application films eventually constitute the electrode active material layers 32.

A thickness of the application films obtained by applying the electrode active material slurry in the application step is not particularly limited, and is to be set as appropriate so that the aforementioned thickness of the electrode active material layers 32 is achieved.

Application means for implementing the application in the application step is not particularly limited, and conventionally well-known application means can be used as appropriate. Among such application means, application means with which it is possible to apply the electrode active material slurry at an application speed at which comparatively high shear force can be imparted during application are preferred from the standpoint of obtaining application films (electrode active material layers 32) that have a highly flat surface by applying the electrode active material slurry, which has a high solid content concentration. Among these application means, an application process performed by a slit-die coater that spreads out the electrode active material slurry from slits and applies the slurry is one example of an optimal application means due to yielding exceptional application of a thin film and exceptional uniformity in application thickness.

In the application step according to the present embodiment, after the electrode active material slurry is applied and the application films are obtained, the resultant application films are not subjected to any drying process performed through heating. This makes it possible to suppress cracking of the electrode active material layers 32 and reduce manufacturing costs required for a drying process. In cases where the electrode active material slurry is not subjected to heating and drying after application, it is difficult to cut out an electrode in a desired area after the application of the electrode active material slurry. Thus, in the method for manufacturing a battery 10 according to the present embodiment, it is necessary to apply the electrode active material slurry to the surface of the current collector 31 in such a manner as to reach the desired area. Therefore, a masking process or other process can be implemented in advance on the surface of the current collector 31 other than a portion subject to application.

Pressing Step

In the method for manufacturing a battery 10 according to the present embodiment, a pressing process can also be performed on the application films obtained through the application of the electrode active material slurry. When the pressing process is implemented, it is preferable to press the surface of the application films in a state in which a porous sheet is disposed thereon. Through implementing such a pressing process, electrode active material layers 32 having higher uniformity of surface are obtained. The porous sheet is used, inter alia, for the purpose of preventing the slurry from adhering to a pressing device when the application films are pressed, or the purpose of absorbing excess electrolytic solution that percolates out during pressing. Therefore, the material and shape of the porous sheet are not particularly limited, provided that the aforementioned purpose can be achieved.

As one example, a sheet that is used as a separator in this technical field and that is similar to a microporous film or a non-woven fabric can be used as the porous sheet. Specifically, examples of the microporous film include: microporous films composed of polyimide, aramid, polyvinylidene fluoride-hexafluoropropylene (PVdF-HFP), and other hydrocarbon-based resins; and microporous films composed of glass fiber, etc. Examples of the non-woven fabric include non-woven fabrics in which the following are used alone or in a mixture: cotton, rayon, acetate, nylon, or polyester; PP, PE, or other polyolefins; and polyimide or aramid.

The porous sheet can be taken out after pressing, or can be used as a separator in the battery 10 without further modification. In cases where the porous sheet is used as a separator without further modification after pressing, the electrolyte layer 40 can be formed with only the porous sheet as a separator, or the electrolyte layer 40 can be formed such that the porous sheet and another separator are combined (specifically, there can be two or more separators).

The pressing device for implementing the pressing process is preferably a device in which pressure is uniformly applied to the entire surface of the application films. The pressure applied per unit area of the application films during pressing is not particularly limited. However, the pressure is preferably 0.01-2 MPa, and more preferably 0.1-1 MPa. When the pressure is within this range, it is possible to easily realize a void ratio and a density of the electrode active material layers 32 according to the preferred embodiment described above.

Unit Cell Formation Step

In the unit cell formation step (S20), the positive electrode 30a, the negative electrode 30b, and the separator are stacked so that the positive electrode active material layer 32a of the positive electrode 30a and the negative electrode active material layer 32b of the negative electrode 30b face each other with the separator interposed therebetween, forming the unit cells 20, 20a, as shown in FIGS. 2A and 2B. In this instance, the seal parts 50 are preferably interposed between the outer peripheral portions of the positive electrode current collector 31a and the outer peripheral portions of the negative electrode current collector 31b, as shown in FIG. 2A. However, the present invention is not limited to this configuration. The seal parts 50 can instead be disposed further outward in a planar direction than the outer periphery of the current collector 31, as shown in FIG. 2B. The seal parts 50 are preferably disposed in a frame shape along the outer peripheral portions of the current collector 31. In the case of the shape shown in FIG. 2A, a seal material (seal material constituting the seal parts 50) is, e.g., applied to the surface of the positive electrode current collector 31a at which the positive electrode active material layer 32a is formed, the seal material being applied so as to surround the outer periphery of the positive electrode active material layer 32a. Similarly, a seal material is applied to the surface of the negative electrode current collector 31b at which the negative electrode active material layer 32b is formed, the seal material being applied so as to surround the outer periphery of the negative electrode active material layer 32b. The positive electrode 30a, the negative electrode 30b, and the separator are then stacked so that the positive electrode active material layer 32a of the positive electrode 30a and the negative electrode active material layer 32b of the negative electrode 30b face each other with the separator interposed therebetween. This makes it possible to form the seal parts 50 so as to be interposed between the outer peripheral portions of the positive electrode current collector 31a and the outer peripheral portions of the negative electrode current collector 31b. In the case of the shape shown in FIG. 2B, a seal material is, e.g., joined by bonding, etc., to the outer periphery of the positive electrode current collector 31a and the negative electrode current collector 31b in advance and is integrated. The positive electrode 30a, the negative electrode 30b, and the separator are then stacked so that the positive electrode active material layer 32a of the positive electrode and the negative electrode active material layer 32b of the negative electrode 30b face each other with the separator interposed therebetween. This makes it possible to form the seal parts 50 further outward in the planar direction than the outer periphery of the current collector 31.

Sealing Step

In the sealing step (S30), the outer peripheral portions 60 of the unit cell 20 that include the seal parts 50 are heat-sealed. In heat sealing, joining strength can be maintained for longer than with bonding using an adhesive agent, and long-term reliability is therefore improved. In addition, the sealing step is preferably performed in an atmosphere under a substantially evacuated state. Employing a substantially evacuated state makes it possible to achieve a hermetic seal by efficiently prevent outside air from infiltrating into a region bounded by the current collector 31 and the seal parts 50 of the unit cell 20. A device for implementing the sealing step is not particularly limited. A conventionally well-known heat sealing device can be used as appropriate.

Figure 7A:
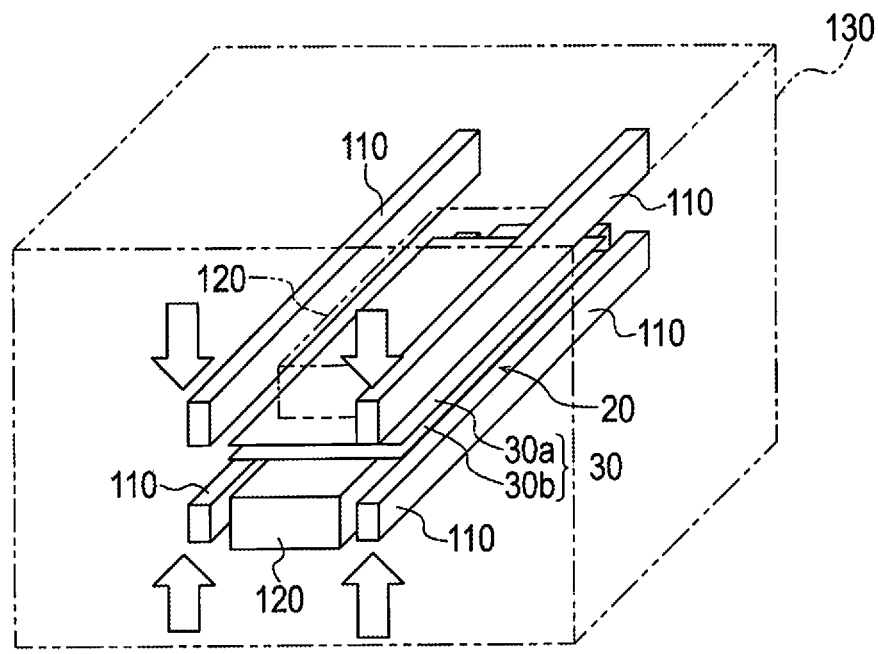
FIG. 7A is a perspective diagram showing one example of a heat sealing device used in the sealing step (S30) shown in FIG. 4.
Figure 7B:
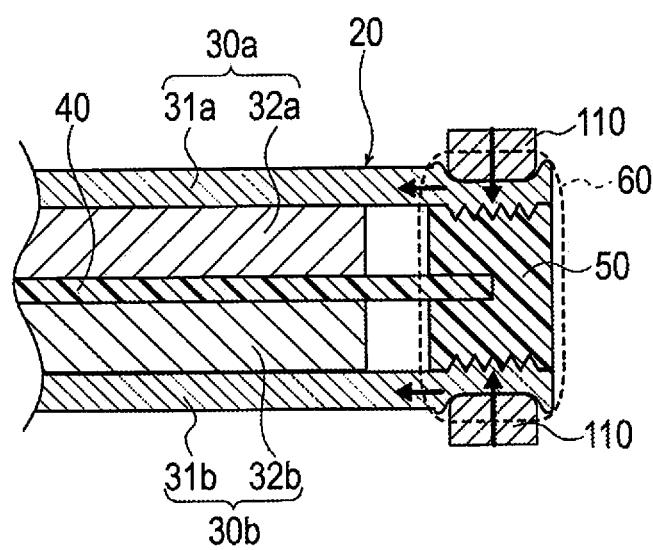
FIG. 7B is a cross-sectional diagram showing circumstances for implementing the sealing step (S30) using heating means of the heat sealing device shown in FIG. 7A.

FIG. 7A is a perspective diagram showing one example of a heat sealing device 100, and FIG. 7B is a cross-sectional diagram showing circumstances for implementing heat-sealing using the heat sealing device 100.

The heat sealing device 100 shown in FIG. 7A has: heating members 110 that heat the outer peripheral portion 60 of the unit cell 20; holding members 120 that hold the positive electrode 30a, the negative electrode 30b, and the separator in a stacked state; and an accommodating part 130 that accommodates the electrode 30 and the separator in the interior thereof, the accommodating part 130 being such that the atmosphere therein is formed into a substantially evacuated state.

In the heat sealing device 100, the heating members 110 are butted against the outer peripheral portions 60 of the unit cell 20 in a state of having been heated to a prescribed temperature in advance, and the outer peripheral portions 60 are sandwiched in the stacking direction (direction of white arrows in FIG. 7A) and subjected to pressure-bonding. Bringing the heated heating members 110 into contact with the outer peripheral portions of the positive electrode 30a and directly into contact with the negative electrode 30b makes it possible to effectively transmit heat. As shown in FIG. 7B, in cases where the outer peripheral portions 60 of the unit cell 20 are configured so that the seal parts 50 are interposed between the outer peripheral portions of the positive electrode current collector 31a and the outer peripheral portions of the negative electrode current collector 31b, the heating members 110 are butted against the outer peripheral portions of the positive electrode current collector 31a and the outer peripheral portions of the negative electrode current collector 31b.

The temperature of the heating members 110 during the sealing step is not particularly limited. For example, the temperature can be set in a range from about 100° C. to about 200° C. The time for the heating step (time required for heat-sealing) also is not particularly limited. The time can be set as appropriate according to a relationship with the constituent members of the seal parts 50. The time for the heating step is ordinarily about one second to about five minutes. The material constituting the heating members 110 is not particularly limited, but a metal having high thermal conductivity is preferred. Examples of the metal having high thermal conductivity include aluminum and copper.

As indicated by arrows in FIG. 7B, heat applied to the outer peripheral portions 60 of the unit cell 20 in the sealing step is transmitted to the current collectors 31a, 31b. In the present embodiment, it is possible to suppress the transmission of heat from the current collectors 31a, 31b to the active material layers 32a, 32b because cooling is performed immediately in a cooling step (described next).

Cooling Step

In the cooling step (S40), the outer peripheral portions 60 of the unit cell 20 are cooled by a cooling medium. This reduces a temperature of the outer peripheral portions 60 of the unit cell 20 more so than an inner side. Because heat is transferred from high-temperature sites to low-temperature sites, the heat transmitted to the current collector 31 is transferred to the outer peripheral portions 60 of the unit cell 20, as indicated by arrows in FIG. 8B. This makes it possible to suppress the transmission of heat from the current collectors 31a, 31b to the active material layers 32a, 32b. A cooling means for implementing the cooling step is not particularly limited, and conventionally well-known cooling means can be used as appropriate.

Figure 8A:
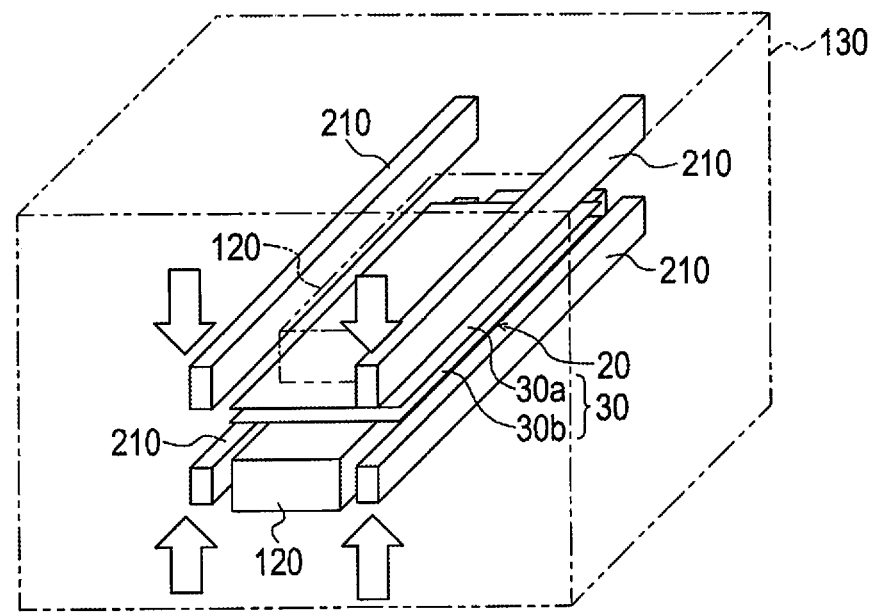
FIG. 8A is a perspective diagram showing circumstances for implementing the cooling step (S40) shown in FIG. 4.
Figure 8B:
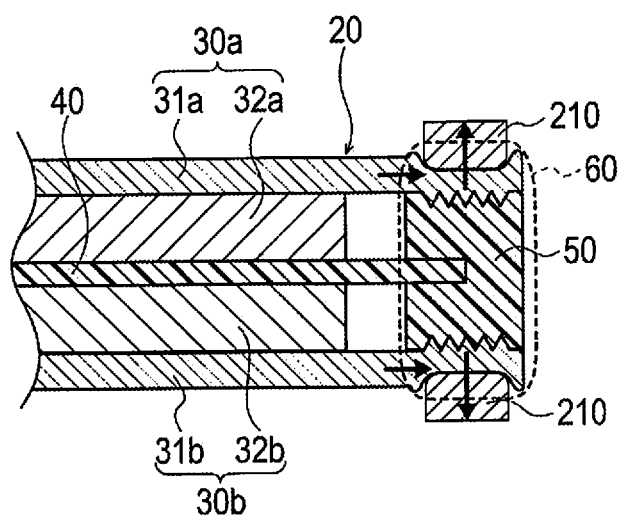
FIG. 8B is a cross-sectional diagram showing circumstances for implementing the cooling step (S40) using the cooling means shown in FIG. 8A.

For example, it is possible to use cooling members 210 as the cooling medium and bring the cooling members 210 into contact with the outer peripheral portions 60 of the unit cell 20 to cool the same. FIGS. 8A and 8B are diagrams showing circumstances for cooling the outer peripheral portions 60 of the unit cell 20 using the cooling members 210.

As shown in FIG. 8A, the heating members 110 of the heat sealing device 100 are exchanged with the cooling members 210 upon having been cooled to a prescribed temperature in advance. Within the accommodating part 130, which is in a substantially evacuated state, the outer peripheral portions 60 of the unit cell 20 held by the holding members 120 are sandwiched by the cooling members 210. The cooled cooling members are directly brought into contact with the outer peripheral portions 60 of the unit cell 20, thereby making it possible to efficiently allow heat to escape to the cooling members 210. This makes it possible to raise the speed of cooling the outer peripheral portions 60 of the unit cell 20.

In the cooling step, creating a substantially evacuated state within the accommodating part facilitates transmission of the heat from the outer peripheral portions 60 of the unit cell 20 to the cooling members 210 because air that would transmit the heat into the atmosphere is not present. This makes it possible to efficiently cool the outer peripheral portions 60 of the unit cell 20. The cooling step is not limited to a method for cooling the outer peripheral portions 60 of the unit cell 20 in a substantially evacuated state, but rather may be carried out through cooling in air.

The temperature of the cooling members 210 in the cooling step is not particularly limited. The temperature can, for example, be set to 10-25° C. A time for the cooling step also is not particularly limited, and can be set as appropriate to a time that is sufficient for cooling the seal parts to such an extent that it is possible to prevent volatilization of the electrolytic solution due to excess heat after the heating step. The time for the cooling step is ordinarily about one second to about five minutes. The material constituting the cooling members 210 is not particularly limited, but a metal having high thermal conductivity is preferred. Examples of the metal having high thermal conductivity include aluminum and copper.

The cooling members 210 are preferably separate members from the heating members 110 used in the heat sealing device 100 in the sealing step. In cases where the heating members 110 are instead cooled and used as cooling members, cooling the heating members 110 takes time. Therefore, while the heating members 110 are being cooled, there is a possibility that heat can be transmitted from the outer peripheral portions 60 of the unit cell 20 to the electrode active material layers 32 via the current collector 31 and the electrolytic solution within the electrode active material layers 32 can volatilize. Forming the cooling members 210 as separate members from the heating members 110 makes it possible to exchange the heating members 110 with the cooling members 210 in a short period of time and immediately cool the outer peripheral portions 60 of the unit cell 20. This further enhances the effect for suppressing transmission of heat from the outer peripheral portions 60 of the unit cell 20 to the electrode active material layers 32 via the current collector 31. The cooling members and the heating members may be configured from the same members. In this case, the heating members are preferably cooled as quickly as possible.

The cooling means is not limited to the configuration described above. For example, a gas or another cooling medium may be blown against an object to be cooled.

Battery Formation Step

Figure 6:
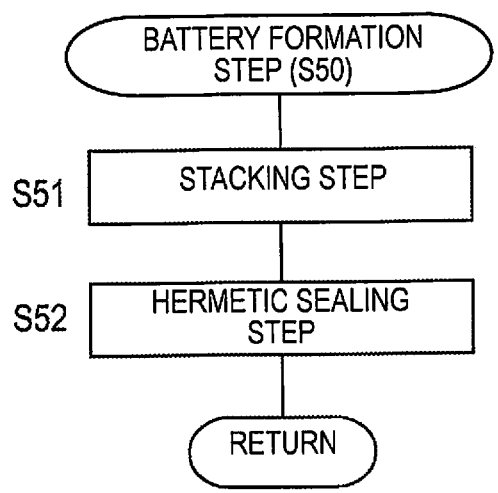
FIG. 6 is a subroutine flow chart for the battery formation step (S50) shown in FIG. 4.

A battery formation step (S50) according to the present embodiment is described next with reference to FIG. 6. FIG. 6 is a subroutine flow chart for the battery formation step (S50) shown in FIG. 4. The battery formation step (S50) according to the present embodiment has a stacking step (S51) and a hermetic sealing step (S52).

Stacking Step

In the stacking step (S51), a plurality of unit cells 20 are stacked to form a stack 11 that is a power-generating element.

Hermetic Sealing Step

In the hermetic sealing step (S52), the stack 11 that is a power-generating element is sealed inside the outer cladding 12. This makes it possible to obtain the battery 10 as shown in FIG. 1.

A method for sealing the stack 11 inside the outer cladding 12 in the hermetic sealing step is not particularly limited. For example, in cases where the outer cladding 12 is a laminate film, examples of the method include a method for coating the stack 11 so as to sandwich the same from both sides along the stacking direction, and sealing end parts through use of thermal fusion, etc. In cases where the outer cladding 12 is a metal can case, examples of such methods include a method for accommodating the stack 11 inside the metal can case, air-tightly shutting the metal can case, and then using a well-known pressure-reducing device to reduce the pressure inside the metal can case.

Initial Charging Step

An initial charging step is described next. The initial charging step is performed between the unit cell formation step (S20) and the battery formation step (S50), or is performed after the battery formation step (S50).

In the initial charging step, the unit cell 20 obtained in the unit cell formation step (S20) or the battery 10 obtained in the battery formation step (S50) is subjected to initial charging. The initial charging is preferably performed while a prescribed increased pressure is applied to the unit cell 20 or the battery 10.

The method for manufacturing a battery 10 according to one embodiment of the present invention as described above exhibits the following effects.

The method for manufacturing a battery 10 has: a unit cell formation step for forming a unit cell in which a positive electrode 30a obtained by a positive electrode active material layer 32a containing an electrolytic solution being disposed on a positive electrode current collector 31a, and a negative electrode 30b obtained due to a negative electrode active material layer 32b containing an electrolytic solution being disposed on a negative electrode current collector 31b, are stacked with a separator interposed therebetween, and in which seal parts 50 are disposed at an outer peripheral portion of the unit cell; a sealing step for heat-sealing the seal parts 50 disposed at the outer peripheral portion 60 of the unit cell 20; and a cooling step for cooling the outer peripheral portion 60 of the unit cell 20 by using a cooling medium, the cooling step being carried out after the sealing step.

According to the method for manufacturing a battery 10, cooling, through use of a cooling medium, the outer peripheral portions 60 of the unit cell 20 that has been heated in the sealing step makes it possible to suppress transmission of heat to the electrode active material layers 32 via the current collector 31 and suppress volatilization of the electrolytic solution within the electrode active material layers 32. As a result, it is possible to suppress changes in the composition of the electrode active material layers 32 and maintain battery performance.

In cases where the current collector 31 is a resin current collector 31, outer peripheral portions of a pair of resin current collectors 31 are preferably heat-sealed in the sealing step, the outer peripheral portions being the outer peripheral portions 60 of the unit cell 20. Typically, a resin current collector has lower thermal conductivity than a metal current collector. Therefore, it is possible to further enhance the effect for suppressing transmission of heat to the electrode active material layers 32 via the resin current collector in the sealing step.

In the cooling step, it is preferable to use the cooling members 210 as the cooling medium and butt the cooling members 210 against the outer peripheral portions 60 of the unit cell 20 to carry out cooling. The cooled cooling members are directly brought into contact with the outer peripheral portions 60 of the unit cell 20, thereby making it possible to efficiently allow heat to escape to the cooling members 210. This makes it possible to raise the speed of cooling the outer peripheral portions 60 of the unit cell 20.

In the sealing step, heating members 110 that are members distinct from the cooling members 210 are preferably butted against the outer peripheral portions 60 of the unit cell 20 to heat the same. Forming the cooling members 210 as separate members from the heating members 110 makes it possible to cool the outer peripheral portions 60 of the unit cell 20 in a short period of time, therefore making it possible to shorten the cooling time. This further enhances the effect for suppressing transmission of heat from the outer peripheral portions 60 of the unit cell 20 to the electrode active material layers 32 via the current collector 31.

Examples

The present invention is described in further detail below through an example. However, the technical scope of the present invention is in no way limited to only the example described below. The term "parts" refers to "parts by mass" unless otherwise noted.

Creation of Resin Solution for Coating Negative Electrode Active Material 83 parts of ethyl acetate and 17 parts of methanol were charged into a four-neck flask fitted with a stirrer, a temperature gauge, a reflux cooling pipe, a dropping funnel, and a nitrogen gas introduction pipe, and the temperature was raised to 68° C.

A liquid monomer compound in which 242.8 parts of methacrylic acid, 97.1 parts of methyl methacrylate, 242.8 parts of 2-ethylhexyl methacrylate, 52.1 parts of ethyl acetate, and 10.7 parts of methanol were compounded, and an initiator solution in which 0.263 parts of 2,2'-azobis(2,4-dimethylvaleronitrile) was dissolved in 34.2 parts of ethyl acetate, were next continuously added dropwise under stirring into the four-neck flask over the course of four hours using the dropping funnel while nitrogen was blown into the four-neck flask, and radical polymerization was carried out. After dropwise addition was complete, an initiator solution in which 0.583 parts of 2,2'-azobis(2,4-dimethylvaleronitrile) was dissolved in 26 parts of ethyl acetate was continuously added over the course of two hours using the dropping funnel. Polymerization was furthermore continued for four hours at a boiling point. After a solvent was removed and 582 parts of a resin was obtained, 1,360 parts of isopropanol was added, and a resin solution for coating the negative electrode active material was obtained, the resin solution being composed of a vinyl resin having a resin solid content concentration of 30 mass %.

Creation of Coated Negative Electrode Active Material 88.4 parts of poorly graphitized carbon (hard carbon) (Carbotron® PS(F)) (Kureha Battery Materials Japan) was introduced into an all-purpose mixer, the resin solution for coating the negative electrode active material (resin solid content concentration: 30 mass %) obtained above was added dropwise and mixed over the course of 60 minutes in an amount of 10 parts in terms of resin solid content in a state in which stirring was carried out at room temperature and a speed of 150 rpm, and stirring was carried out for a further 30 minutes.

1.6 parts of acetylene black (Denka Black® (Denka)) was next mixed in a stirred state over the course of three instances, the temperature was raised to 70° C. while stirring was performed for 30 minutes, and the pressure was reduced to 0.01 MPa and held steady for 30 minutes to obtain a coated negative electrode active material. When the coated negative electrode active material was considered to have a core-shell structure, the average particle diameter of a poorly graphitized carbon powder serving as the core was 9 μm. The solid content of the acetylene black was 1.6 mass % relative to 100 mass % of the coated negative electrode active material.

Creation of Coated Positive Electrode Active Material 140.0 parts of a lithium nickel-aluminum-cobalt oxide (NCA) (BASF Toda Battery Materials) was introduced into the all-purpose mixer, a solution in which 14.6 parts of dimethylformamide was added and mixed into 0.48 parts of a resin solution for coating the positive electrode active material (resin solid content concentration: 30 mass %) obtained as described above was added dropwise and mixed over the course of 3 minutes in a state in which stirring was carried out at room temperature and a speed of 15 m/s, and stirring was carried out for a further five minutes.

8.6 parts of acetylene black (Denka Black® (Denka)) was next mixed in a stirred state, the temperature was raised to 140° C. while stirring was performed for 60 minutes, and the pressure was reduced to 0.01 MPa and held steady for five minutes to obtain a coated positive electrode active material. Assuming the coated positive electrode active material to have a core-shell structure, the average particle diameter of a lithium nickel-aluminum-cobalt oxide powder serving as the core was 6 μm. The solid content of the acetylene black was 0.1 mass % relative to 100 mass % of the coated positive electrode active material.

Preparation of Electrolytic Solution

Li[(FSO$_2$)$_2$N](LiFSI) was dissolved at a proportion of 2 mol/L in a mixed solvent of ethylene carbonate (EC) and propylene carbonate (PC) (volume ratio: 1:1) to obtain an electrolytic solution.

Preparation of Negative Electrode Active Material Slurry

From the coated negative electrode active material obtained as described above, a portion having an average particle diameter (D50) of 20 μm was separated in an amount of 616 parts, and a portion having an average particle diameter (D50) of 5 μm was separated in an amount of 264 parts. 76.5 parts of carbon fiber (Donacarbo Milled S-243 (Osaka Gas Chem), having an average fiber length of 500 μm, an average fiber diameter of 13 μm, and an electrical conductivity of 200 mS/cm) serving as an electroconductive member was added thereto, drying was carried out for 16 hours at a temperature of 120° C. and a reduced pressure of 100 mmHg, and a moisture-containing component was removed.

637.7 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), thereby churning the mixture.

638.9 g of the electrolytic solution obtained as described above was then furthermore added, and the same mixing stirrer as described above was used to stir the resultant mixture in three instances for ten minutes each at a rotation speed of 63 rpm and a revolution speed of 107 rpm, thereby churning the mixture. A negative electrode active material slurry was thus obtained. The solid content concentration of the negative electrode active material slurry obtained in this manner was 41 mass %.

Creation of Positive Electrode Active Material Slurry 31.5 parts of carbon fiber (Donacarbo Milled S-243 (Osaka Gas Chem), having an average fiber length of 500 μm, an average fiber diameter of 13 μm, and an electrical conductivity of 200 mS/cm) serving as the electroconductive member was added to 1543.5 parts of the coated positive electrode active material obtained as described above, drying was carried out for 16 hours at a temperature of 120° C. and a reduced pressure of 100 mmHg, and a moisture-containing component was removed.

393.8 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), thereby churning the mixture.

417.6 parts of the electrolytic solution obtained as described above was then furthermore added, and the same mixing stirrer as described above was used to stir the resultant mixture in three instances for ten minutes each at a rotation speed of 63 rpm and a revolution speed of 107 rpm, thereby churning the mixture. A positive electrode active material slurry was thus obtained. The solid content concentration of the positive electrode active material slurry obtained in this manner was 66 mass %.

Creation of Resin Current Collector 75 mass % of polypropylene (trade name "SunAllomer® PL500A" (SunAllomer)) (B-1), 20 mass % of acetylene black (AB) (Denka Black®), and 5 mass % of a modified polyolefin resin (Umex® 1001 (Sanyo Chemical Industries)) serving as a dispersant (A) for the resin current collector was melt-kneaded at a temperature of 180° C. and a speed of 100 rpm, with a residence time of 10 minutes, using a twin-screw extruder to obtain a material for the resin current collector. The resultant material for the resin current collector was extrusion-molded to obtain a resin current collector (20% AB-PP).

Creation of Electrode

The negative electrode active material slurry and the positive electrode active material slurry obtained as described above were applied to the surface of the resin current collector, and a pressing process was implemented. A positive electrode 30*a* and a negative electrode 30*b* were thus obtained.

Creation of Unit Cell

The positive electrode 30*a* and the negative electrode 30*b* were next stacked with a separator interposed therebetween to obtain a unit cell 20. Seal parts 50 were disposed between outer peripheral portions of the resin current collector of the positive electrode 30*a* and outer peripheral portions of the resin current collector of the negative electrode 30*b*. The width of the electrode was set to 256 (mm). A resin in which ethylene, propylene, and butene were copolymerized and which had an amorphous polypropylene resin as a main component was used as the material constituting the seal parts 50.

Sealing Step

The heat sealing device 100 shown in FIG. 7A was next used to heat-seal the outer peripheral portions 60 of the unit cell 20 in an atmosphere under a substantially evacuated state. Specifically, the unit cell was first accommodated in the accommodating part 130 in a substantially evacuated state. Planar-direction central portions of the unit cell 20 were next sandwiched and held from the stacking direction by the holding members 120. The outer peripheral portions of the unit cell 20 were next sandwiched from the stacking direction by heating members 110 that had been heated to a prescribed temperature in advance, and this arrangement was held for 60 seconds in a state in which an increased pressure was applied. The temperature of the positive electrode 30a-side heating members 110 was set to 120±3° C., and the temperature of the negative electrode 30b-side heating members 110 was set to 165±3° C.

Cooling Step

After the sealing step, the heating members 110 of the heat sealing device 100 were cooled to a temperature of 20±3° C. and exchanged with cooling members 210, and cooling of the outer peripheral portions 60 of the unit cell 20 was started, as shown in FIGS. 8A and 8B, within one minute from when heating was complete. Aluminum was used as the material constituting the cooling members 210. The outer peripheral portions 60 of the unit cell 20 held by the holding members 120 was sandwiched by the cooling members 210 within the accommodating part 130 in a substantially evacuated state, and this arrangement was held for one minute in a state in which an increased pressure was applied.

Comparative Example

The same procedure as in the example described above was employed to form a unit cell, except that the cooling step was carried out through natural cooling. The natural cooling was performed in an atmosphere at a temperature of 20±3° C. under a substantially evacuated state. The width of the electrode was set to 256 (mm).

Evaluation of Unit Cells

A portion (damaged part) of the electrode active material layers where the electrolytic solution volatilized in the unit cells created according to the example and the comparative example described above was observed, and a width-direction length L (see FIG. 9) of the electrode was measured. The charge/discharge efficiency (%) and the discharge capacity maintenance ratio (%) of the unit cells were measured under the conditions described below. The results are shown in Table 1.

Measurement of Charge/Discharge Efficiency

One charging/discharging cycle is performed in the unit cells created as described above. In charging/discharging, the unit cells were charged to a termination voltage of 4.2 V through CCCV charging, and then the unit cells were discharged to a termination voltage of 2.5 V. When charging/discharging the unit cells, a charge capacity (battery capacity during charging) and a discharge capacity (battery capacity during discharging) were measured. The charge/discharge efficiency (Coulombic efficiency) was calculated as a proportion of the battery capacity during discharging to the battery capacity during charging.

Measurement of Discharge Capacity Maintenance Ratio

Charging/discharging was repeated for 100 cycles, and then the cell capacity during discharge was measured. The discharge capacity maintenance ratio was calculated as a proportion of the discharge capacity after 100 cycles to the initial discharge capacity.

TABLE 1

|  | Electrode width (mm) | Damaged part (mm) | Charge/discharge efficiency (%) | Charge capacity maintenance ratio (after 100 cycles) (%) |
| --- | --- | --- | --- | --- |
| Example | 256 | 0 | 99.8 | 81.9 |
| Comparative example | 256 | 8 | 99.6 | 59.5 |

As shown in Table 1, no damaged parts were observed in the example. However, in the comparative example, a damaged part measuring 8 (mm) was observed, and it is understood that the electrolytic solution volatilized due to heat in the sealing step. The charge/discharge efficiency (%) in both the example and the comparative example was 99% or higher. However, the discharge capacity maintenance ratio (%) was at least 20% lower in the comparative example than in the example. The causes of these differences are examined below.

Figure 9:
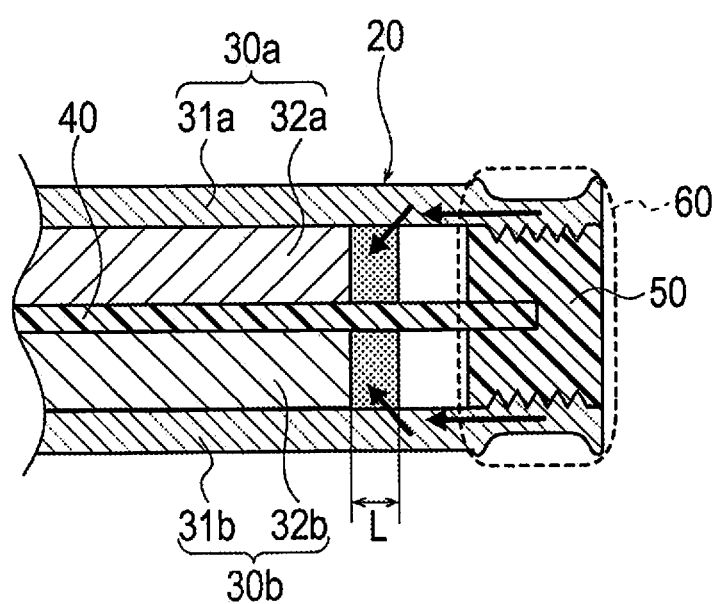
FIG. 9 is a cross-sectional diagram showing an outer peripheral portion of a unit cell in a cooling step according to a comparative example.

FIG. 9 is a cross-sectional diagram showing an outer peripheral portion of a unit cell in a cooling step according to the comparative example. In the comparative example, natural cooling was performed in a substantially evacuated state, and therefore heat applied to the outer peripheral portions of the unit cell in the sealing step was not transmitted and radiated through air. Therefore, the heat was transmitted to the electrode active material layers 32a, 32b via the current collectors 31a, 31b, as indicated by arrows in FIG. 9. As a result, the electrolytic solution within the electrode active material layers 32a, 32b volatilized, and the composition of the electrode active material layers 32a, 32b changed. No remarkable reduction was seen with respect of the initial charge/discharge efficiency. However, adverse effects due to the change in the composition became apparent after 100 cycles, and the discharge capacity maintenance ratio (cycle durability) fell dramatically.

By contrast, in the example, the heated outer peripheral portions 60 of the unit cell 20 were cooled in the cooling step as shown in FIG. 8A. The temperature of the outer peripheral portions 60 of the unit cell 20 was thereby reduced more so than the inner side. Because heat is transferred from high-temperature sites to low-temperature sites, the heat transmitted to the current collector 31 was transferred to the outer peripheral portions 60 of the unit cell 20, as indicated by the arrows in FIG. 8B. This made it possible to suppress the transmission of heat from the current collectors 31a, 31b to the active material layers 32a, 32b. As a result, it was possible to suppress changes in the composition of the electrode active material layers 32 and improve cycle durability.

The invention claimed is:

1. A battery manufacturing method comprising:
    forming a unit cell that comprises stacking a positive electrode that is obtained by a positive electrode active material layer containing a first electrolytic solution being disposed on a positive electrode current collector, a negative electrode that is obtained by a negative electrode active material layer containing a second electrolytic solution being disposed on a negative electrode current collector, and a separator interposed between the positive electrode and the negative electrode, and disposing a seal part disposed on an outer peripheral portion of the unit cell;

heat sealing the seal part disposed at the outer peripheral portion of the unit cell; and cooling the outer peripheral portion of the unit cell by using a cooling medium, the cooling of the outer peripheral portion of the unit cell being carried out after the heat sealing of the seal part, the battery manufacturing method being carried out such that the positive electrode and the negative electrode are formed without an application film being subjected to a drying process performed through heating, and the battery manufacturing method being carried out such that no electrolytic solution is injected into the unit cell after formation of the unit cell, the cooling being performed by placing a cooling member in contact with the outer peripheral portion of the unit cell in an evacuated state, the cooling member being formed of a metal material.

2. The battery manufacturing method according to claim 1, wherein the positive electrode current collector and the negative electrode current collector are resin current collectors; and during the heat sealing of the seal part, outer peripheral portions of the resin current collectors are heat sealed, the outer peripheral portions of the resin current collectors being the outer peripheral portion of the unit cell.

3. The battery manufacturing method according to claim 1, wherein during the cooling of the outer peripheral portion, cooling members are used as the cooling medium, and the cooling members are butted against the outer peripheral portion of the unit cell to cool the outer peripheral portion of the unit cell.

4. The battery manufacturing method according to claim 3, wherein during the heat sealing of the seal part, heating members comprising members distinct from the cooling members are butted against the outer peripheral portion of the unit cell to heat the outer peripheral portion of the unit cell.

5. The battery manufacturing method according to claim 1, wherein each of the positive electrode active material layer and the negative electrode active material layer comprises 10% by mass or less of a binder relative to 100% by mass of a total solid content in the positive electrode active material layer and the negative electrode active material layer, respectively.

6. The battery manufacturing method according to claim 1, wherein the positive electrode and the negative electrode are formed without subjecting the application film to a drying process that includes heating.

* * * * *